United States Patent [19]
Grein et al.

[11] Patent Number: 5,483,242
[45] Date of Patent: Jan. 9, 1996

[54] METHOD FOR MEASURING THE DISTANCE AND VELOCITY OF OBJECTS

[75] Inventors: Nicolas Grein, Kandel; Hermann Winner, Karlsruhe, both of Germany

[73] Assignee: Robert Bosch GmbH, Stuttgart, Germany

[21] Appl. No.: 166,781

[22] Filed: Dec. 14, 1993

[30] Foreign Application Priority Data

Dec. 17, 1992 [DE] Germany ............... 42 42 700.2

[51] Int. Cl.⁶ ..................... G01S 13/58; G01S 13/53
[52] U.S. Cl. ............... 342/111; 342/116; 342/128; 342/192; 342/196
[58] Field of Search .................. 342/111, 112, 342/115, 116, 128, 129, 192, 194, 196, 105, 107, 109

[56] References Cited

U.S. PATENT DOCUMENTS

| | | | |
|---|---|---|---|
| 4,901,083 | 2/1990 | May et al. | 342/128 |
| 5,134,411 | 7/1992 | Adler | 342/130 |
| 5,204,682 | 4/1993 | Beasley | 342/117 |
| 5,247,306 | 9/1993 | Hardange et al. | 342/70 |
| 5,252,981 | 10/1993 | Grein et al. | 342/200 |
| 5,268,692 | 12/1993 | Grosch et al. | 342/70 |
| 5,302,956 | 4/1994 | Asbury et al. | 342/70 |
| 5,315,306 | 5/1994 | Doughty et al. | 342/192 |
| 5,325,095 | 6/1994 | Vadnais et al. | 342/22 |
| 5,325,097 | 6/1994 | Azhang et al. | 342/71 |
| 5,347,282 | 9/1994 | La Grange et al. | 342/193 |
| 5,349,358 | 9/1994 | Canal | 342/128 |
| 5,381,153 | 1/1995 | Saito et al. | 342/70 |

FOREIGN PATENT DOCUMENTS

WO92/11543   7/1992   European Pat. Off. .

*Primary Examiner*—John B. Sotomayor
*Attorney, Agent, or Firm*—Kenyon & Kenyon

[57] ABSTRACT

In a method for measuring the distance and the velocity of objects employing electromagnetic waves, the frequency of an emitted signal is modulated. The signals received during one rise and one drop in the frequency of the emitted signal are mixed with the emitted signal. The intermediate-frequency signals resulting from the mixing are then spectrally analyzed. The distance and the velocity of at least one object are calculated from the frequency of the spectral lines of the intermediate-frequency signals during at least one rise and at least one drop in the frequency of the emitted signal.

5 Claims, 3 Drawing Sheets

METHOD FOR MEASURING THE DISTANCE AND VELOCITY OF OBJECTS

BACKGROUND OF THE INVENTION

The present invention relates to a method employing electromagnetic waves to measure the distance and velocity of objects.

Various methods for measuring distances employing electromagnetic waves (e.g., radar) are known. With FMCW radar, electromagnetic waves are continuously emitted from a source while their frequency is modulated with essentially a ramp shape between two values. In the known methods of this type, the waves are reflected by the object whose distance from the source is being measured and the reflected waves are received. The received waves are mixed with simultaneously emitted waves. During the change in frequency, i.e., during the ramp of the modulation signal, the propagation delay and, consequently, the distance of the object can be simply inferred from the intermediate frequency acquired as a result of the mixing.

If the reflecting object moves in relation to the source, the reflected signal experiences a Doppler shift. This phenomenon is exploited in a method described in International Application No. WO 92/11543 for measuring distance and velocity. In that method, the difference in frequency during one rise and during one drop in the frequency of the emitted waves is measured, the velocity is calculated from the difference in the variations in frequency, and the distance is calculated from the average value of the variations in frequency.

In one variation of this known method, the wave reflected by an object, or rather the intermediate-frequency derived from it, is evaluated.

Unfortunately, the previously known methods permit the distance or velocity of only one object to be measured at any given time. Therefore, there is a need for a method in which the distances and velocities of several objects within the range of a measuring device may be determined.

SUMMARY OF THE INVENTION

The present invention provides a method which permits the distances and velocities of several objects situated simultaneously within the detection (i.e., acquisition) range of one measuring device to be measured. The present invention does so by: (i) modulating the frequency of an emitted signal; (ii) mixing the signal received during one rise and one drop in frequency of the emitted signal with the emitted signal; (iii) spectrally analyzing intermediate frequency signals resulting from the mixing; and (iv) calculating the distance and velocity of at least one object from the frequency of the spectral lines of the intermediate-frequency signals.

The method of the present invention advantageously provides very accurate measurements, particularly for the relatively small distances and velocities that occur in road traffic. Furthermore, the method of the present invention permits distance to be measured with particular precision. The present invention does so by compensating for the Doppler effect that has a disturbing effect in known methods.

As a result of the above mentioned advantages, the method of the present invention is particularly well suited for use in distance-warning devices in motor vehicles. By using the velocity of the vehicle in which the device is accommodated, the method of the present invention permits such devices to differentiate, in a simple manner, between approaching objects, stationary objects, and objects driving in front of the vehicle.

In preferred embodiments of the method of the present invention, ambiguities which can otherwise occur are avoided by providing a further step of evaluating the results of several successive measurements.

A further embodiment of the method of the present invention advantageously limits the computational time required in spectral analysis by spectrally analyzing the intermediate-frequency signals within a predetermined frequency range of, for example, 0 to 300 kHz. This predetermined range is dependent upon the ranges of distances and velocities to be acquired and upon the slope of the ramp selected.

DETAILED DESCRIPTION

Figure 1:
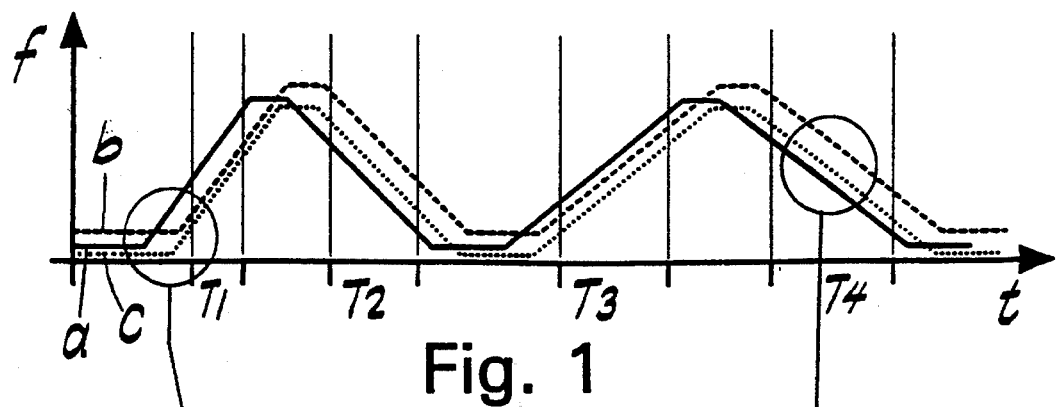
FIGS. 1, 1a and 1b depict the time characteristic of the frequency of an emitted signal and of two received signals.

The same reference numerals are assigned to the same elements in each of the Figures.

Figure 1A:
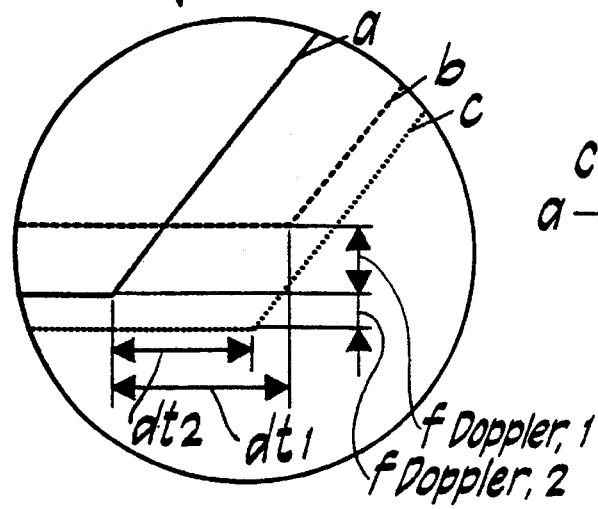

FIG. 1a depicts the time characteristic of the frequency of the emitted signal as a solid line a. The frequency of the emitted signal changes in a ramp shape between several plateaus of constant frequency. In one measuring cycle comprising four ramps in this exemplary embodiment, the frequency rises during a first measuring time $T_1$ and drops again during a second measuring time $T_2$. The frequency rises or falls during the measuring times $T_3$ and $T_4$, respectively, with a smaller rate of change than that occurring during the measuring times $T_1$ and $T_2$.

If this frequency-modulated radar signal hits one or several reflecting objects, then a part of the reflection signal may be received by an antenna provided at the emitter source. Curves b and c depict the frequency characteristics of two such received signals. The received signals characteristically include a time delay caused by the distance covered. The received signals will also include a shift in frequency caused by the Doppler effect if the distance between the transmitting and receiving device (e.g., Radar) and the reflecting object changes with time.

Figure 1B:
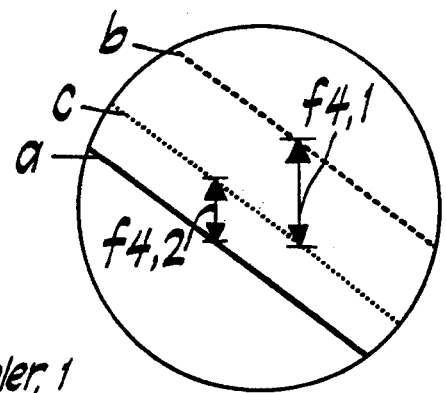

To more precisely illustrate this relationship, sections of FIG. 1a are shown in an enlarged representation in FIGS. 1b and 1c. A reflected signal from a first object (dashed-line curve b) is delayed by the propagation delay (i.e., echo time) $dt_1$ and shifted by the frequency $f_{Doppler,1}$. In the signal reflected by the first object, the Doppler effect leads to an increase in frequency, indicating that the first object is moving toward the transmitting and receiving device. A reflected signal from a second object (dotted-line curve c) is delayed by the propagation delay (i.e., echo time) $dt_2$ and shifted by the frequency $f_{Doppler,2}$. The frequency displacements and time displacements are greatly exaggerated to more clearly illustrate the method of the present invention.

FIG. 1c depicts the frequency differentials between the emitted signal (curve a) and the received signals (curves b and c) during the measuring time $T_4$. These differences in frequency are each indexed according to the measuring time and the reflecting object. Thus, for example, $f_{4,1}$ signifies the difference in frequency between the received signal reflected by the first object and the emitted signal during the measuring time $T_4$.

The received signals are mixed with those emitted simultaneously, so that the differences in frequency occur as frequencies within one intermediate-frequency band and can be further processed. Such further processing may include, in particular, spectral analysis. Spectral analysis can be achieved, for example, by sampling, digitizing, and then performing a discrete Fourier transformation.

The result of such an analysis is illustrated for the measuring times $T_1$ through $T_4$ and for the received signals that are assumed in FIG. 1a. Each reflecting object is indicated by a local maximum, whose frequency position is dependent upon its distance and relative velocity.

The propagation delay between the emitting and receiving of a signal amounts to $dt=2s/c$, where "c" is the speed of light and "s" is distance. At the receiving instant, the frequency of the emitted signal rises by $df = (f_H/T) \cdot dt = 2s \cdot f_H/(T \cdot c)$ to a higher value, where "$f_H$" is the frequency deviation of the ramp and "T" is the duration of the ramp. Therefore, $f_H/T$ is the rate of the increase in the frequency. Mixing the emitted and the received signal results in an intermediate frequency of $$f_O = df = 2s \cdot f_H/(T \cdot c).$$

If the reflecting object moves in relation to the radar with the velocity $v_r$, then a Doppler shift of $f_B = -2v_r \cdot f_T/c$ results in the received signal, where "$f_T$" is the fundamental frequency of the emitted signals. Two sets of intermediate frequencies $f_{1,i}$ and $f_{2,i}$ are produced for n acquired objects and for two measurements or ramps in accordance with the following equations:

$$f_{1,i} = |a_1 \cdot s_i + b \cdot v_{r,i}|$$

$$f_{2,i} = |a_2 \cdot s_i + b \cdot v_{r,i}|$$

where $a_1 = 2f_{H,1}/(T \cdot c)$, $a_2 = 2f_{H,2}/(T \cdot c)$, $b = 2f_T/c$. The value "i" is a whole number corresponding to a particular object and can assume the values 1 through n.

Figure 2A:
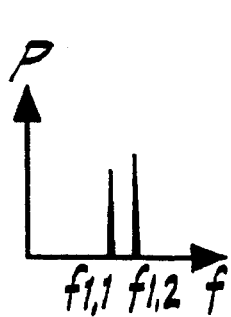
FIGS. 2a through 2d depict the power spectra of the signals received at various instants.
Figure 2B:
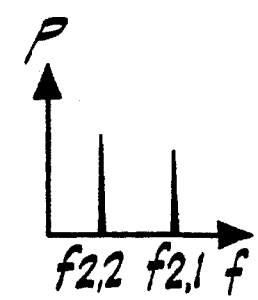
Figure 2C:
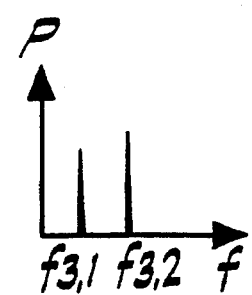
Figure 2D:
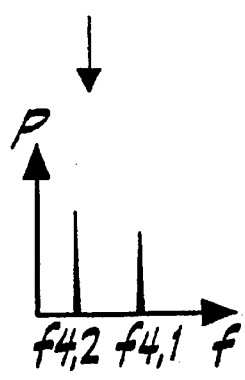

Thus, two equations with two unknowns are available for each object. From these equations, the distance s and the velocity $v_r$ can be calculated. However, the evaluation of the intermediate frequencies during a rising and a subsequent falling edge must be based on the same allocation between the intermediate frequencies and the particular object. To guarantee this, all allocations are initially assumed to be as possible. In FIGS. 2a and 2b, the system of equations with the indexing indicated in the FIGS and, in addition, with a transposition of, for example, $f_{2,2}$ and $f_{2,1}$ are calculated. Lastly, the plausibility of each result is checked. If for example, an object is moving with a velocity that is not possible in road traffic in one of the assumed allocations, then the other allocation is correct.

Moreover, the velocity can be calculated in a subsequent calculation by using newly acquired distance information and the time difference between the distance acquisitions. This velocity can then be compared to velocities acquired with the aid of the Doppler effect.

In the embodiment depicted in FIGS 1a–1c and 2a–2d, one measuring cycle includes four ramps. The third and the fourth ramp exhibit a different slope than the first and the second. The slope of the four ramps can assume the following values, for example: +300 MHz/1 ms, –300 MHz/1 ms, +100 MHz/ms and –100 MHz/ms, respectively. In this manner, the measured frequencies can be better allocated to the objects.

In a preferred embodiment of the method of the present invention, the ramp slope is selected such that the influence of the Doppler effect is less than the influence of the propagation delay. As a result, the time difference predominates in the above-mentioned equations. As a result, the operational sign of the sum merely depends on whether the ramp is a rising or falling ramp, which is known. Thus, the operational sign is independent of the quantities to be determined.

The slope of the ramps influences resolution as described below. When a relatively small ramp slope is used, a greater resolution of the velocity results due to the greater Doppler effect, while when a relatively steep ramp is used, the Doppler effect has less of an influence and, as a result, an object can be identified more easily based on its distance. By reversing the ramp slope and by changing the magnitude of the slope (as shown in the exemplified embodiment depicted in FIG. 1a), the method of the present invention permits both the velocity and the distance to be determined with excellent resolution.

Figure 3:
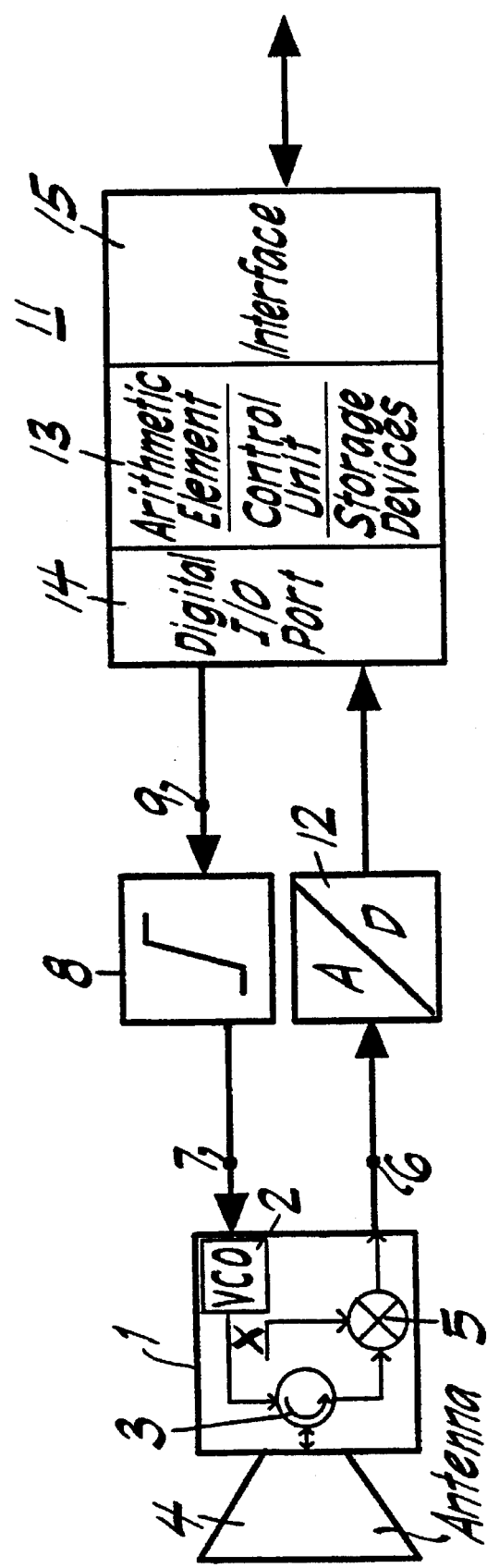
FIG. 3 is a block diagram of a device for implementing the method of the present invention.

FIG. 3 depicts a block diagram of a device for implementing the method of the present invention. A generally known FMCW radar front end includes a controllable oscillator (VCO) 2, a circulator (or transducer) 3, an antenna 4, and a mixer 5. The output signal from the controllable oscillator 2 is supplied via the circulator 3 (or tranducer) to the antenna 4 where it is emitted. The wave that returns after being reflected by an object is supplied as a corresponding signal via the circulator 3 (or tranducer) to the mixer 5, and is mixed there with the output signal from the oscillator 2. The intermediate frequency that results corresponds to the difference in the frequencies of the emitted signal and the received signal and is available at the output 6 of the mixer 5.

A signal for modulating the frequency of the emitted signal is supplied to a control input 7 of the controllable oscillator 2. This signal has the ramp shape depicted schematically in FIG. 1a and is produced by a ramp generator 8. The ramp generator 8 operates in a generally known way and includes an integrator, which is fed voltages having opposite operational signs during the ramps. To control this up and down integration, control signals from a control and arithmetic unit 11 are supplied to the input 9 of the ramp generator 8.

In addition to an arithmetical element, a control unit and the usual storage devices (denoted altogether in FIG. 3 by 13), the control and arithmetic unit 11 contains digital input/output ports 14 for connection to the ramp generator 8 and to the analog to digital converter 12. The control and arithmetic unit 11 includes an interface 15 to a higher-level system.

The higher level system, for example, displays, registers, or otherwise evaluates the measured values. Since the control and arithmetic unit 11 generally corresponds to those used in known FMCW radar units, a detailed description is omitted. Compared to known control and arithmetic units, the arithmetical element 13 is essentially designed to implement the method of the present invention by performing a rapid Fourier transformation and the computations described above in connection with FIGS 1a–1c and 2a–2d.

Figure 4:
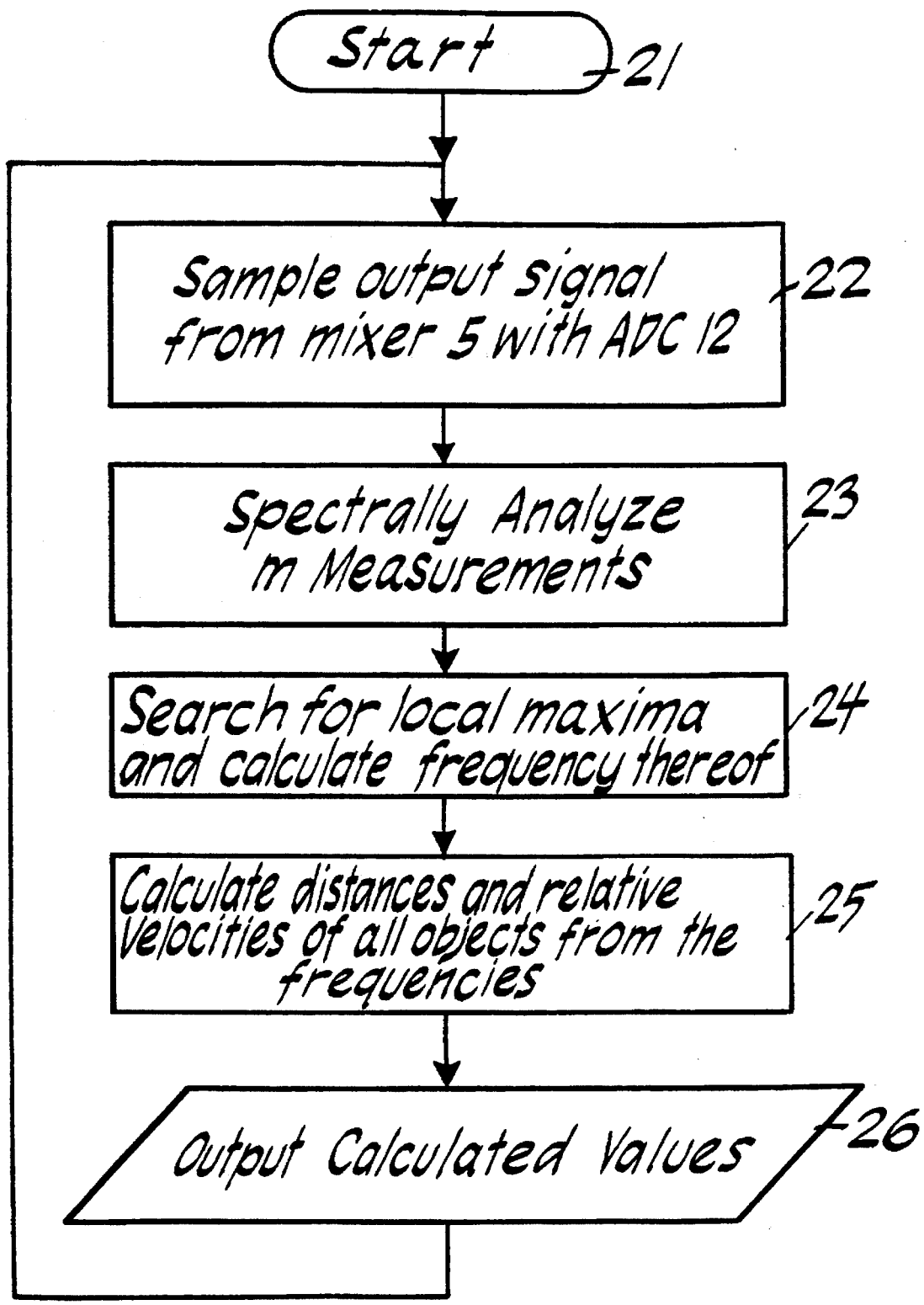
FIG. 4 is a flow chart illustrating the method of the present invention.

The method depicted as a flow chart in FIG. 4 is initiated at step 21. When a modulated signal (i.e., a sequence of m ramps) is being transmitted, the output signal from the mixer 5 (see FIG. 3) is sampled in the analog to digital converter 12 at step 22. After the sequence is completed, sampling values of m measurements are then available in a storage device of the control and arithmetic unit 11.

The m measurements are then spectrally analyzed in step 23, whereupon local maxima are searched in the spectra and their frequency is calculated at step 24. From the frequencies, the distance s and the relative velocity $v_r$ are then calculated for all objects at step 25.

The calculated values are output in step 26, for example to a display device or to a higher-level computer for further processing.

What is claimed is:

1. A method for measuring the distance $S_i$ and the velocity $V_{r,i}$ of objects employing electromagnetic waves, comprising the steps of:

a) modulating a frequency of an emitted signal;

b) receiving signals during at least one rise and at least one drop in the frequency of the emitted signal;

c) mixing the signals received in step (b) with the emitted signal to form intermediate-frequency signals;

d) spectrally analyzing the intermediate-frequency signals resulting from the mixing to determine frequencies corresponding to spectral lines; and e) calculating the distance $S_i$ and the velocity $V_{r,i}$ of at least one of the objects from the frequencies of the spectral lines of the intermediate-frequency signals during at least one rise and at least one drop in the frequency of the emitted signal, wherein the intermediate-frequency signals are spectrally analyzed within a frequency range of approximately 0 to 300 kHz.

2. The method of claim 1 wherein the step of spectrally analyzing includes a rapid Fourier transformation.

3. The method of claim 1 wherein the step of calculating includes the sub-step of solving the following system of equations for the distance $s_i$ and the velocity $V_{r,i}$ of n objects:

$f_{1,i} = |a_1 \cdot s_i + b \cdot v_{r,i}|$
   $f_{2,i} = |a_2 \cdot s_i + b \cdot v_{r,i}|$ wherein
   $a_1 = 2f_{H,1}/(T \cdot c)$,
   $a_2 = 2f_{H,2}/(T \cdot c)$,
   $b = 2f_t/c$,
   n is a whole number,
   $f_{1,i}$ is an intermediate frequency during one rise in frequency,
   $f_{2,i}$ is an intermediate frequency during one drop in frequency,
   $f_{h,1}$ is a frequency deviation during one rise in frequency,
   $f_{H,2}$ is a frequency deviation during one drop in frequency,
   T is the duration of one of the rise and the drop,
   $f_T$ is a fundamental frequency of the emitted signal, and
   c is the speed of light.

4. The method of claim 3 further comprising the step of selecting a correct allocation from several possible allocations between different objects and different intermediate frequencies which are considered when solving the system of equations by comparing several successive measurements.

5. The method of claim 1 wherein the step of calculating includes the sub-step of solving the following system of equations for the distance $s_i$ and the velocity $V_{r,i}$ of n objects:

$f_{k,i} = |a_k \cdot s_i + b \cdot v_{r,i}|$
   wherein
   $a_k = 2f_{H,k}/(T \cdot c)$,
   $b = 2f_T/C$,
   n is a whole number,
   $f_{k,i}$ is an intermediate frequency in the case of a k-th ramp resulting from a reflection at an i-th object,
   $f_{H,k}$ is a frequency deviation during the k-th ramp,
   T is the duration of one ramp,
   $f_T$ is a fundamental frequency of the emitted signal, and
   c is the speed of light.

\* \* \* \* \*